(No Model.) 2 Sheets—Sheet 2.

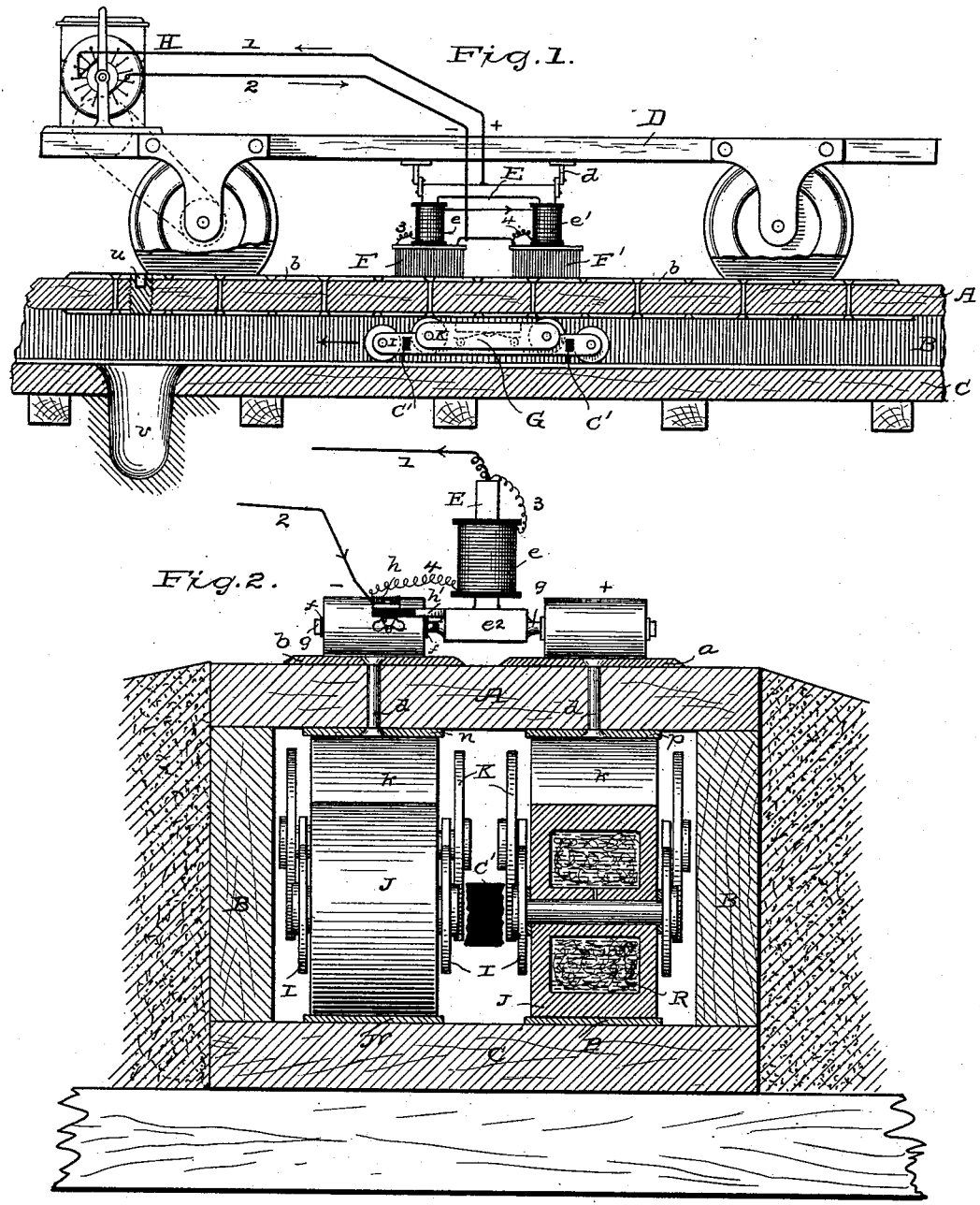

C. J. VAN DEPOELE.
UNDERGROUND CONDUIT FOR ELECTRIC CONDUCTORS.

No. 393,276. Patented Nov. 20, 1888.

Witnesses,
H. A. Lamb,
Geo. H. Campbell.

Inventor,
Charles J. Van Depoele
By his Attorney
Frankland Jannus

UNITED STATES PATENT OFFICE.

CHARLES J. VAN DEPOELE, OF CHICAGO, ILLINOIS.

UNDERGROUND CONDUIT FOR ELECTRIC CONDUCTORS.

SPECIFICATION forming part of Letters Patent No. 393,276, dated November 20, 1888.

Application filed April 22, 1887. Serial No. 235,775. (No model.)

*To all whom it may concern:*

Be it known that I, CHARLES J. VAN DEPOELE, a citizen of the United States, residing at Chicago, in the county of Cook, State of Illinois, have invented certain new and useful Improvements in Underground Conduits for Electric Conductors, of which the following is a description.

My invention relates to improvements in conduits for electric railways, and is an improvement upon my previous application filed March 12, 1887, Serial No. 230,648. It consists, partly, in so constructing and arranging the conduit located between the rails, and within which the main conductors for conveying the current to the motors upon the vehicles to be propelled are contained, that both the positive and the negative conductors can be contained therein, disposing of the necessity for using the rails as a return-conductor.

With this system of conduit I use two carriages similar in principle to those described and claimed in my previous application above referred to, the two carriages traveling upon and making contact with completely separated conductors contained within the one conduit, the carriages themselves being, however, united by a coupling of non-conducting material, so that they will at all times travel together without being capable of forming a short circuit between the main conductors, upon which they rest and travel.

It also consists in a novel form of contact carriage or follower for use in the interior of the conduit, as well as the various details of arrangement, construction, and operation, which will be hereinafter fully described, reference being had to the accompanying drawings, in which—

Figure 3:
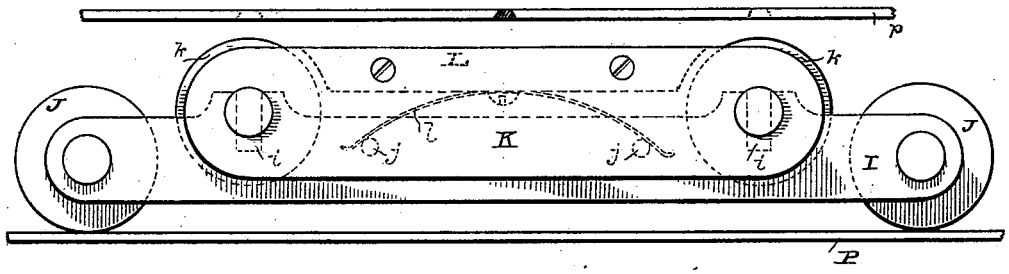
Figure 4:
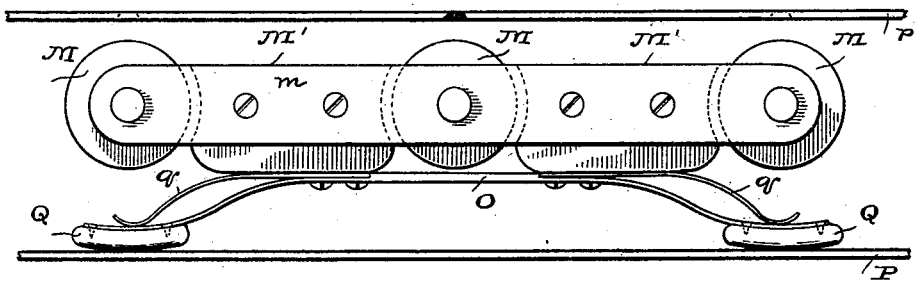
Figure 5:
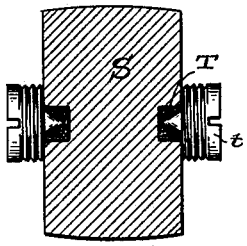

Figure 1 is an elevation, partly in section, showing a portion of a conduit with the contact-carriage, contact-brushes, and a motor-car in their respective operative relations. Fig. 2 is an enlarged sectional view of the conduit, showing an end elevation of the duplex carriage and exterior contact devices, a portion of one of the carriages and of the contact device being broken away. Fig. 3 is a side elevation of the carriage. Fig. 4 is a modification thereof. Fig. 5 is a detail view showing an anti-friction bearing for the wheels of the carriage.

Similar letters denote like parts throughout.

A is the top, B are the side pieces, and C is the bottom, of the conduit, which may be constructed in the manner shown and described in any of my previous applications filed, respectively, February 8, 1887, Serial No. 226,952, and March 12, 1887, Serial No. 230,648—that is to say, it is formed of stout boards, preferably of oak, and about two inches in thickness. However, heart pine or any other durable insulating material having a specific heat greater than that of the atmosphere will fully answer all requirements, the method of securing the several pieces of which the conduit is built up being treated in my said previous applications.

In addition to the application of water-proof insulating substances to the various portions of the conduit for the purpose of preventing decay and rendering the same water-tight, I coat the inner side walls with paraffine or some other substance of that description, which will act as a lubricant in case the carriage should strike or rub against them and prevent them sticking or developing such excessive friction as would stop or jam the carriage should it be inclined to swerve or vibrate in its course. On the interior of the conduit, preferably at the bottom, although they might be attached to the side walls, are arranged a double set of continuous permanent positive and negative main conductors, P and N, placed a sufficient distance apart to prevent any danger of the current jumping from one to another and forming an arc. Discontinuous conductors *n p* are secured to the under side of the top piece, A, directly above the main conductors P N. The exterior of the piece A, which is the portion arranged about on a level with the main roadway, is provided with short metallic plates *a b*, corresponding with the discontinuous conductors *n p* within the conduit, and which are, say, one foot in length, although they may be longer if found desirable, and are formed with sloping ends, so that, being secured firmly upon the top piece, A, of the conduit, and each exterior section being connected by a metallic bolt, *d*, with its corresponding interior one, *n p*, respectively, the traveling contact devices carried by the vehicle receiving current from the interior will make contact with the section in advance before entirely leaving the one to the rear, and in that manner establish and maintain continuous electrical connection with the interior of the conduit without any breaking of the circuit and consequent sparking and destruction of the moving current-collecting devices, while at the same time providing an exterior conductor that is divided into so many portions that there can be no possibility of injury to life or property by reason of a short circuit.

As fully set forth in my application before referred to, Serial No. 230,648, filed March 12, 1887, the contact carriage or carriages used to make connection between the upper and lower or continuous and discontinuous conductors on the interior of the closed water-tight conduit consist of a strong electro-magnet furnished with contact brushes or rollers, said brushes or rollers constituting the poles of said magnet, and thereby bringing the magnetic field directly against the outer surface of the conduit, the effect of which will be to attract and carry along with it a contact carriage or follower formed in whole or in part of magnetic material, the said carriage constituting the electrical connection between the main conductor within the conduit and the discontinuous contact-plates on the exterior thereof.

In case a portion of the track and conduit were actually submerged no injury or leakage would occur, for until the contact devices were actually upon the particular portion of track covered by water there would be no electrical communication between the interior and the exterior conductors, and consequently nothing to affect the electrical condition of the inclosed conductor, and, even though the exterior plates were submerged when in circuit, the resistance of the water would be so much greater than that of the circuit of the motor upon the vehicle to be propelled that the current would flow through the motor in preference to escaping to ground through the water, and, while possibly suffering some loss, the loss will not be sufficient to deprive the motor of sufficient current to propel it through the submerged portion, nor will it be great enough to short-circuit the main conductors or to deprive other motors upon the same circuit of their necessary current.

As described in my former application, the contact device within the conduit is caused to travel along with and continuously close the motor-circuit by means of electro-magnets, which I have shown as depending from beneath the car D, being supported by a suitable metallic frame, d. E is the core of the magnet, and e e' are the magnetizing-coils, the brushes or rollers F F' constituting the pole-pieces, from which the magnetism extends to the iron portion of the contact-carriage G. H is the motor, the circuit of which extends from the positive side of the contact devices by conductor 1 and returns by conductor 2 to that portion of the duplex contact connection which is in circuit with the return-conductor N. The magnetizing-coils e e' are energized by coils of fine wire connected in derivation between the main conductors by conductors 3 4, as is most fully shown in Fig. 2, only one set of the contact devices being visible in Fig. 1.

In describing the conduit within which the conductors are inclosed as a closed or hermetically-sealed conduit I do not wish to be understood as meaning a conduit that is necessarily air-tight throughout its entire length or one into which there is no admittance, as such is not my design. I have selected wood, paper-board, or similar insulating substance as being particularly suited to the present purpose because, while constituting extremely good insulators, especially when coated with tar, asphaltum, paint, or any of the well-known substances capable of being applied to that purpose, they possess a further advantage resulting from the fact that, the specific heat of these materials being higher than that of the atmosphere, condensation does not take place upon their surfaces, and therefore that so far as the body of the conduit itself is concerned it might be entirely closed without any water of condensation forming therein and tending to interfere with the proper working of the conductors. Inasmuch, however, as the metallic conductors contained within said conduit will at times cause some condensation, although to a very limited extent, I propose to locate at the lowest points of all grades, and more frequently if found desirable, receiving-tanks U, into which the condensed fluids will find their way and accumulate. Suitable openings, which may be closed by screw-plugs u or left open, if desired, are provided, through which the condition of these accumulators may be ascertained, through which also a pump may be inserted to withdraw their contents. Obviously these accumulators may be connected with a system of sewerage, so as to require no inspection; but this will depend entirely upon local conditions.

Although according to the present invention I use duplex conductors both within and without my closed conduit, thus providing a complete self-contained metallic circuit for supplying the motors to be propelled, I find it convenient to construct the duplex contact-carriage in two separate parts, either of which is entirely suitable to be used separately in those forms of conduit heretofore described by me, and in which conductors of one polarity only are employed, the two parts being united by a block, C', of insulating material secured to both. A form of carriage, G, which I find well suited to the present purpose is constructed as follows: I I are side pieces of brass or other diamagnetic metal, and these side pieces are united by end wheels or rollers, J, forming a long narrow truck, in the present instance about fourteen inches long and two inches wide. A shorter and similar truck or carriage is composed of side pieces, K, end wheels, k, and a central block, L, all of iron. The side pieces, K, are placed somewhat farther apart than are the side pieces, I, so as to fit over the outside of and ride upon the supporting-truck, the spindles of the iron rollers k fitting down into vertical slots i, formed in the sides I to receive them. A spring, l, is secured to the under side of the iron block L, and, extending downward, rests upon cross-pins j, extending through the sides I of the carrying-truck, and upon these pins the iron contact-truck is supported by the spring l, its function being to support the contact-truck in a position one-half inch or so below the upper conducting-strips within the conduit, so that when affected by the magnet carried by the vehicle to be driven the iron contact-truck will rise in its bearings until the wheels k are in contact with the said upper conductor, where they remain as long as the device is under the influence of the said magnet, the supporting and contact portions of the truck being as a whole inseparable while in the conduit.

In Fig. 4 is shown a modification of the contact devices just described, in which the upper portion, consisting of three iron wheels, N, are supported within an iron frame, m, the spaces between the wheels being filled by blocks M', also of iron. To the under side of these blocks or to the frame is secured a copper conducting-strip, O, which extends downward and is provided with brushes or friction-blocks Q, which bear against the lower conductor and are held down with any desired degree of pressure or with any degree of pressure that will normally maintain the carriage in the desired position—which is just out of contact with the upper conductor—by the springs q.

The wheels of my carriages are formed with interior hollow chambers, R, which chambers are filled with cotton-wicking, and have an axis extending therefrom to the axis upon which they revolve. An aperture is also made in the side for the purpose of injecting a supply of oil, and when once filled a constant supply of lubricant will be delivered to the axis until exhausted. The action of the self-oiler is to throw the oil all away from the center when the carriage is in motion, a portion of which will run back toward the axis whenever the carriage stops and find its way to the aforesaid aperture and to the spindle. I propose, however, to use a bearing requiring no oil, which, as shown in Fig. 5, consists of a button of plumbago or any of the materials specially designed for use as dry bearings. The plumbago should be prepared so as to possess the required density and strength and be compressed or molded into a form that can be conveniently fitted into recesses cut out in the hubs of the wheels themselves. S indicates such a wheel, T being the anti-friction material, and t a conical screw-threaded bearing which is driven through the side pieces of the carriages and into the conical recess formed in the button T. Where found convenient or desirable, I propose to make the anti-friction material extend completely through the wheel, and, instead of the conical screws t, I shall then use a spindle passing entirely through the wheel, as previously described with reference to the iron portion of the circuit-completing carriage or follower.

Various means may be employed for establishing connection between the exterior traveling contact and the motor, both for the positive and negative conductors extending thereto. In Fig. 2 is shown a duplex contact device comprising two sets of iron rollers mounted upon axles $e^2$, the said axles being secured to the respective extremities of the U-shaped core E and magnetized in precisely the same manner as are the brushes F F'. In order to admit of one set of the rollers being used to convey the return-current, the said rollers are fitted with an interior lining of insulating material, f, within which the spindle g has its bearing, and, while not interfering with the magnetic effect of the coils e e' upon said rollers, it will be electrically insulated from the opposite ones. The return-conductor 2 is connected with the insulated rollers by metallic brushes h, which are secured to an arm or arms, h', secured to and insulated from the axles upon which the wheels are supported.

Various minor modifications and changes may be made in the arrangement of the devices described and without in any way departing from the spirit of the invention.

Having described my invention, what I claim, and desire to secure by Letters Patent, is—

1. In electric railways, the combination of a closed conduit, positive and negative conductors within said conduit, a traveling contact in independent electrical connection with the inclosed conductors, electric connections in the path of the traveling contact and extending to the exterior of the conduit, and translating devices completing a working-circuit, substantially as described.

2. In electric railways, the combination of a closed conduit, main working-conductors within said conduit, discontinuous electrical connections extending from the interior to the exterior of the conduit, and a traveling contact moving within the conduit and establishing independent electric connection between the conductors and contacts, substantially as described.

3. In electric railways, the combination of a closed conduit, main working-conductors within said conduit, discontinuous electrical connections extending from the interior to the exterior of the conduit, and a traveling contact moving within the conduit and establishing independent electric connections between the conductors and contacts, and an exterior traveling magnetic device moving in inductive proximity to the traveling contact and in circuit with translating devices closing a working-circuit spanning the inclosed conductors, substantially as described.

4. In electric railways, the combination of a closed conduit, main working-conductors within said conduit, a discontinuous series of electric connections for each main working-conductor, said connections extending from the interior to the exterior of the conduit, and a duplex traveling contact arranged to move within the conduit to establish independent electrical connection between the inclosed conductors and the contacts, substantially as described.

5. In electric railways, the combination of a closed conduit, positive and negative main conductors arranged within said conduit, discontinuous connections extending through the upper part of said conduit, and a contact-carriage arranged to travel within said conduit and to make connection between the interior and exterior conductors, substantially as described.

6. In electric railways, the combination of a closed conduit, positive and negative conductors, a duplex contact-carriage, and the discontinuous interior and exterior contact-plates, the interior contact-plates being arranged in the path of the contact-carriage, substantially as described.

7. In electric railways, a closed conduit provided with accumulating basins or tanks and having openings formed in the wall or walls of said conduit in proximity thereto, substantially as described.

8. The herein-described traveling contact, comprising a part formed of diamagnetic material and adapted to move in electrical connection with the main conductor, and a part comprising magnetic metal and movably supported thereon in proximity to the branch conductor or conductors, substantially as described.

9. The herein-described contact-carriage, consisting of a supporting portion of diamagnetic material arranged to move in electrical contact with the main conductor and an upper portion or rider formed in whole or in part of iron and arranged to be normally supported in proximity to the branch conductor, as described.

10. The herein-described contact-carriage, comprising the wheeled truck of diamagnetic metal and the rider-spring supported upon the carrying-truck and formed in whole or in part of iron, substantially as described.

11. In a contact-carriage for electric railways, an anti-friction bearing consisting of a button of plumbago or anti-friction metal embedded in the carrying-wheels thereof, substantially as described.

In testimony whereof I hereto affix my signature in presence of two witnesses.

CHARLES J. VAN DEPOELE.

Witnesses:
WILLIAM A. STILES,
JOHN EASON.